INVENTOR
WATT V. SMITH

Aug. 11, 1964    W. V. SMITH    3,144,279
SLIDING CONTACT BEARING FOR CONTRA-ROTATING SHAFTS
Filed Sept. 22, 1960    3 Sheets-Sheet 2

INVENTOR
WATT V. SMITH
BY
ATTORNEY

United States Patent Office 3,144,279
Patented Aug. 11, 1964

3,144,279
SLIDING CONTACT BEARING FOR
CONTRA-ROTATING SHAFTS
Watt V. Smith, Severna Park, Md., assignor to the United
States of America as represented by the Secretary of
the Navy
Filed Sept. 22, 1960, Ser. No. 57,854
14 Claims. (Cl. 308—35)
(Granted under Title 35, U.S. Code (1952), sec. 266)

The invention described herein may be manufactured and used by or for the Government of the United States of America for governmental purposes without the payment of any royalties thereon or therefor.

The invention relates to shaft bearings for contra-rotating coaxial shafts; and more specifically relates to a sliding contact bearing for the shafts of contra-rotating propellers.

The present invention allows the use of a slider bearing between contra-rotating coaxial shafts thereby overcoming these disadvantages of roller type bearings.

An object of the invention is to provide a sliding contact bearing for use with contra-rotating coaxial shafts that has a useful load capacity.

It is another object of this invention to provide a sliding contact bearing for coaxial shafts for contra-rotating ship propellers.

A further object of the invention is to provide a sliding contact bearing for contra-rotating coaxial shafts that has a long life and high tolerance to dirt.

Another object of the invention is to provide a sliding contact bearing for contra-rotating coaxial shafts that has a low modulus of elasticity, allows the use of water as a lubricant, and that has sufficient internal clearances to allow the shafts to deflect slightly.

Other objects and many of the attendant advantages of this invention will be readily appreciated as the same becomes better understood by reference to the following detailed description when considered in connection with the accompanying drawings wherein like numbers indicate like parts.

Generally stated, the invention comprises an intermediate sleeve member between the coaxial shafts that provides a slider bearing for the inside of the outer shaft and for the outside of the inner shaft, and means to control the angular velocity of the intermediate sleeve member with respect to the inner coaxial shaft so that the slider bearing has a maximum or useful load carrying capacity.

Figure 1:
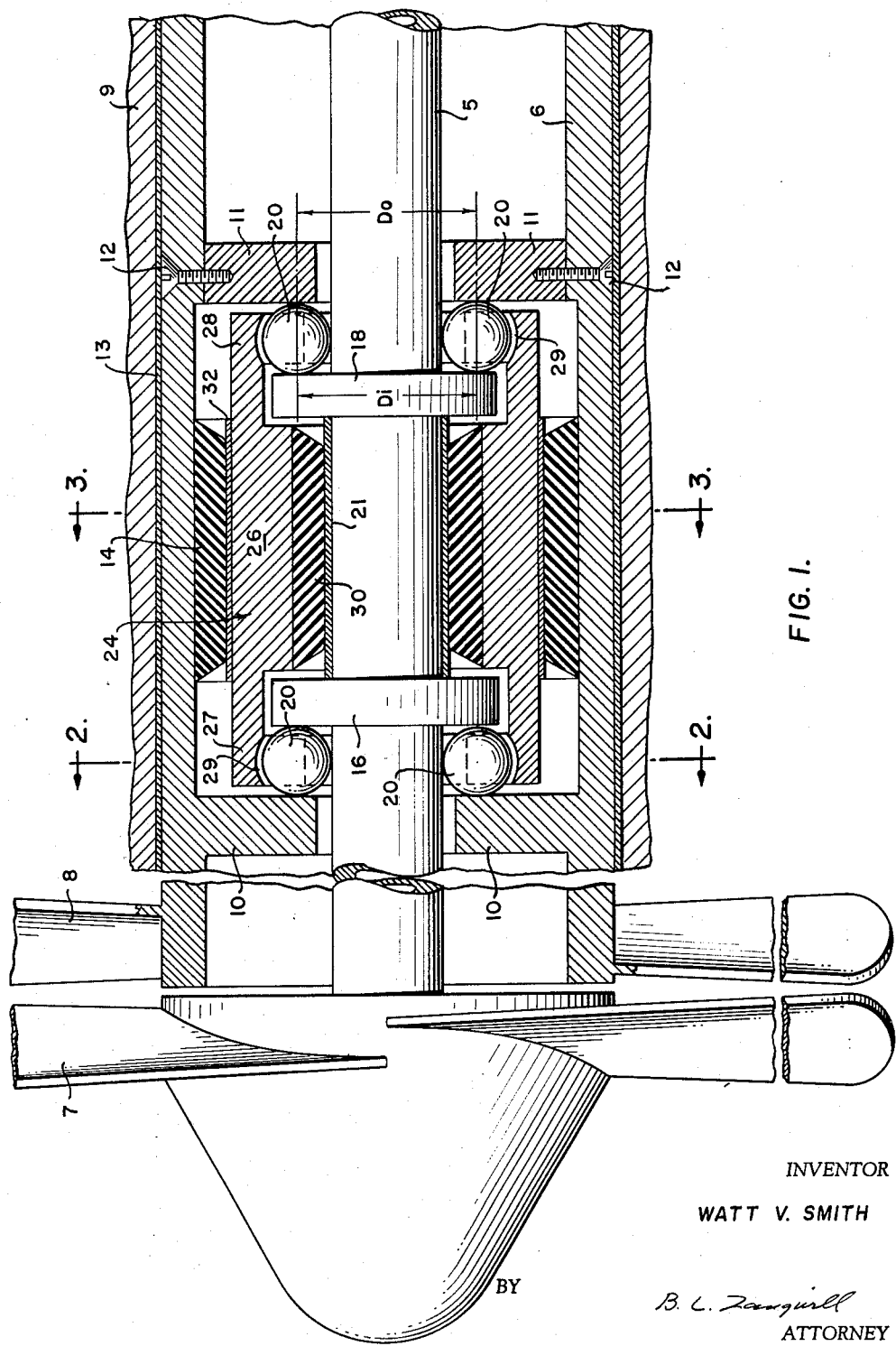
FIG. 1 is a side elevational view, partly in section, of a preferred embodiment of the invention.
Figure 2:
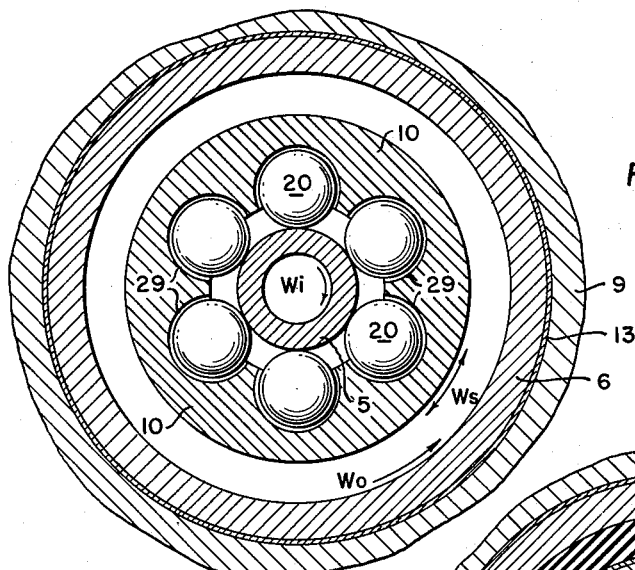
FIG. 2 is a sectional view taken substantially along line 2—2 of FIG. 1.
Figure 3:
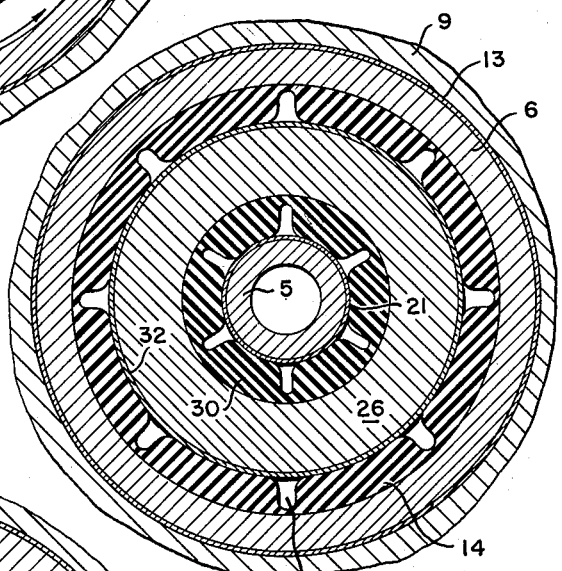
FIG. 3 is a sectional view taken substantially along line 3—3 of FIG. 1.
Figure 5:
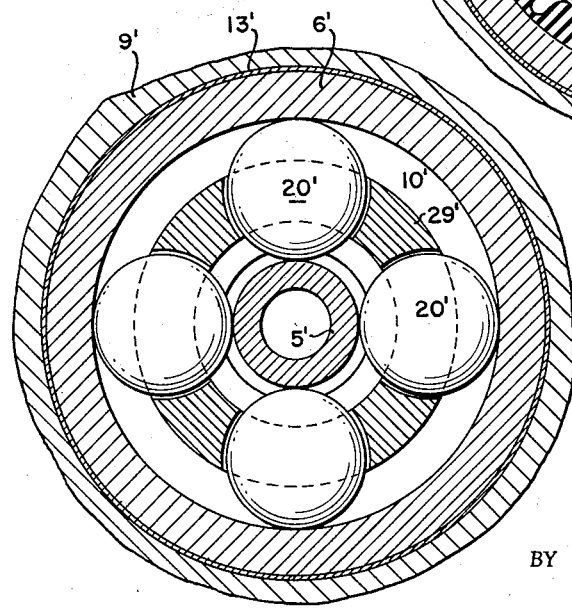
FIG. 5 is a sectional view taken substantially along the line 5—5 of FIG. 4.

With reference to FIGS. 1, 2, and 3, there are shown tubular contra-rotating coaxial inner and outer shafts 5 and 6, respectively, used to drive oppositely rotating propellers 7 and 8. The coaxial shafts are preferably of steel and are shown journalled in strut or stern tube 9 in FIG. 1; however, it is to be understood that the shafts may be fixed in position at various locations in the ship's hull and at each location the invention may be utilized.

As shown in FIG. 1, the outer shaft 6 also comprises annular, inwardly radially extending axially-spaced flange members as at 10 and 11. The flange member 10 is shown integral with the outer shaft while flange 11 is shown as being removable for ease of assembly and disassembly. Flange 11 is removably held in position with respect to the outer shaft by a plurality of screws 12 spaced circumferentially about the outer shaft and extending through the wall of the outer shaft and into the flange 11.

A bearing sleeve 13, formed of a suitable bearing material such as bronze, is secured to the outer periphery of outer shaft 6 by suitable means and bears against the strut or stern tube bearing in a conventional manner. A resilient bearing member 14, formed of a suitable plastic or rubber material, is secured to the inner wall of the outer tube or shaft 6.

As shown in FIG. 1, inner shaft 5, between the flanges 10 and 11 on the outer shaft, comprises spaced apart annular radially extending flanges or shoulders 16 and 18 which, in conjunction with flanges 10 and 11 respectively, form axial spaces that contain a plurality of resilient rolling members or rollers 20. The flanges contact the rollers 20 on opposite sides and restrain them against axial movement relative to the inner and outer shafts. The rolling members 20 are made from a material having a low modulus of rigidity so that forces arising from uneven running of the coaxial shafts are not readily transmitted from one shaft to the other. In addition the roller members 20 are selected to have a high coefficient of friction with respect to the flanges 16 and 18, and flanges 10 and 11 respectively, and are preferably formed of rubber, plastic, or other similar material.

A protective bearing sleeve member 21, made from a suitable material such as bronze, is secured to and extends about the circumference of the inner shaft between flanges 16 and 18.

A slider bearing means for the shafts 5 and 6 comprises a tubular intermediate sleeve, indicated in its entirety by the reference numeral 24, that lies in the space between the shafts 5 and 6 between the flanges 10 and 11. The sleeve 24 comprises a tubular bearing-backing 26 formed of a material such as steel. The backing 26 of the sleeve 24 has end portions 27 and 28 that overhang the flanges 16 and 18, and are formed to provide equally spaced curved cages or pockets 29 for the roller members 20 which in this embodiment are shown as a plurality of balls spaced circumferentially about the axis of the inner shaft. FIG. 2 shows the manner in which the end portions 28 and 29 of the backing 26 of the intermediate hollow sleeve member 24 are formed to retain or confine the roller members 20. Conversely, the roller members 20 aid in holding the sleeve 24, so that the roller members and sleeve are in relatively fixed spatial position with respect to each other.

The sleeve 24 also comprises a bearing member 30 which is formed from a suitable plastic or rubber, and is secured to the inner periphery of the backing 26 of the sleeve. The surface of the bearing member 30 bears against the protective sleeve 21 secured to the inner shaft 5 and thus forms a sliding bearing contact for the shaft 5. A protective bearing sleeve member 32, preferably formed from the same material as protective bearing member 21, is secured to the outer periphery of the backing 26 and is adapted to bear against resilient bearing member 14 of shaft 6 to form a sliding bearing contact for the shaft 6.

The bearing member 14 of shaft 6 and the bearing member 30 of the sleeve 24 are preferably formed with a plurality of stave-like projections circumferentially separated by grooves 33, as shown in FIG. 3.

In operation, the roller members are rotated by the forces thereon created by their frictional contact with the shafts 5 and 6, actually the shaft flanges. These forces act on opposite sides of the roller members and are in opposite directions. In a sense, this structure constitutes a planetary arrangement, with the roller members constituting planetary gears adapted to rotate about their own axes and to revolve as a whole about the shaft axis.

Theoretically, the operation of the device of FIGS. 1–3 may be explained as follows: With reference to FIG. 1, the effective diameter of the inner shaft at the point where the inner shaft contacts rollers 20 is $D_i$. The effective diameter of the outer shaft at the point where the outer shaft contacts roller 20 is $D_o$. Because the balls 20 contact the flanges at the diameter of the balls which is parallel to the axis of the shafts, $D_i$ is equal to $D_o$. Assume that $W_i$ is the angular velocity of the inner shaft; $W_o$ is the angular velocity of the outer shaft; and $W_s$ is the angular velocity of the intermediate sleeve 24. In operation, $W_i$ will be equal to $W_o$ but of opposite sign because the shafts rotate at the same rotational speed but in opposite directions.

It can be seen that with the arrangement shown, the assembly comprising the inner and outer shafts, the intermediate sleeve member, and the rollers resemble a planetary gear. Under the circumstances, the speed of rotation of the intermediate sleeve 24 (neglecting slip, frictional, and elastic effects) will be $$\frac{W_s}{W_o} = \frac{D_o - D_i}{D_o + D_i}$$

Upon solving the equation for $W_s$, it is found that the angular velocity of the sleeve 18 is zero $D_o$ equals $D_i$. Thus, by using the arrangement shown in FIG. 1 the intermediate sleeve 24 is theoretically fixed in space and provides for maximum load carrying capacity. The intermediate sleeve 24 will remain fixed in position if the frictional forces at the interfaces of the slider bearing surfaces of the shafts are ignored, or if the force applied to the intermediate sleeve by the roller members 20 is great enough to override and counteract the frictional forces developed at the interfaces.

Figure 4:
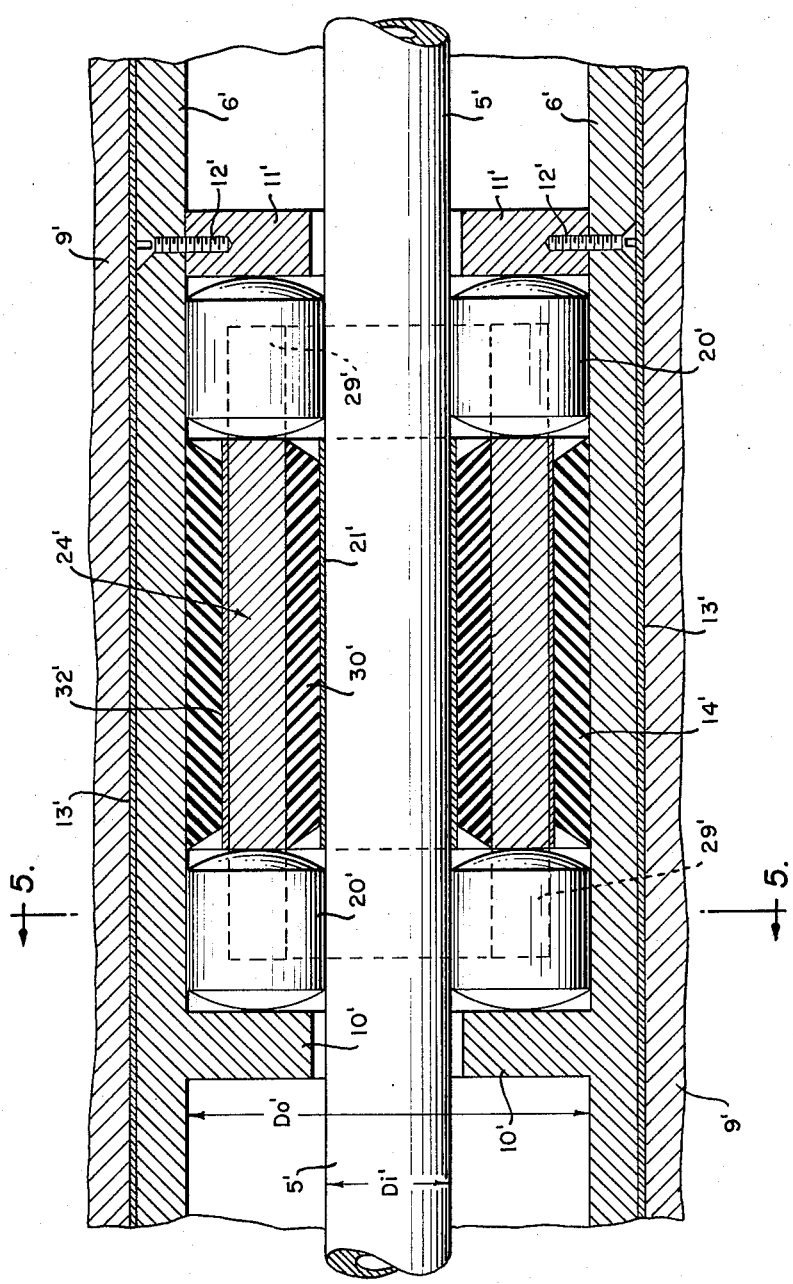
FIG. 4 is a sectional view of another embodiment of the invention wherein the angular velocity of the intermediate sleeve member may be varied as desired.

Another embodiment of the general principles of the invention is shown in FIG. 4. Referring to FIG. 4, an inner shaft 5' is coaxially positioned within an outer hollow shaft 6' which is adapted to be rotatively held in position with respect to a ship's hull in, for example, a stern tube or strut A frame. For this purpose, a suitable bearing 13', such as bronze, is provided on the outer circumference of the outer shaft.

The inner side of outer shaft 6' has inwardly extending flanges 10' and 11' at spaced locations. Flange 10' is formed integrally with the outer shaft while flange 11' is removably held in position by screws 12' spaced circumferentially about the inner circular periphery of the outer shaft and extending through the wall of the outer tube into the flange 11'.

A tubular intermediate sleeve 24', having an inner and outer slider bearing surface, is positioned between the outer shaft and the inner shaft between flanges 10' and 11'. The ends of the intermediate sleeve are formed with a plurality of circumferentially spaced races or pockets 29' adapted to receive resilient cylindrical roller members 20' formed of a material such as rubber or plastic, which roll against the outer periphery of the inner shaft and the inner periphery of the outer shaft and are held in position axially by flanges 10', 11', and intermediate sleeve 24'. In the embodiment shown, the roller members 20' are arranged about shaft 5' with their axes parallel to the shafts and intermediate sleeve.

An inner resilient bearing 30', formed from a suitable material such as rubber, is part of the inner periphery of intermediate sleeve 24' and bears against a protective bearing sleeve 21' suitably attached to and extending about the outer periphery of the inner shaft. A protective bearing sleeve 32', preferably formed from the same material as sleeve 21', is attached to the outer periphery of the intermediate sleeve and bears against a resilient bearing 14' secured to the inner periphery of the outer shaft.

In that roller members 20' are restrained in the pockets 29' formed in intermediate sleeve 24' and further contact the outer shaft and inner shaft, it is apparent that the intermediate sleeve 24' will be caused to planetate about the axis of the shafts. Theoretically, the angular velocity of the intermediate sleeve 24' can be determined from the equation $$\frac{W_s'}{W_o'} = \frac{D_o' - D_i'}{D_o' + D_i'}$$

as in connection with the embodiment of FIG. 1. Upon solving the equation for $W_s'$ it is found that the angular velocity of the intermediate sleeve may be varied (assuming $W_o'$ is a constant, and neglecting slip, elastic effects, etc.) by varying $D_o'$ and/or $D_i'$. This would also entail changing the diameter of the roller members 20' of course.

The invention thus provides a means of establishing a stationary or slowly moving reference point with respect to a load, which means comprises a driven intermediate sleeve positively positioned so that the bearings for the shafts will retain a load carrying capacity.

As understood, it appears that the load carrying capacity of inner and outer slider bearings provided by the intermediate sleeve 24 or 24' of the two embodiments, is dependent upon the hydrodynamic film built up between the bearings and the shaft or sleeve in contact with the bearings. Thus, with reference to FIG. 4, there is a fluid film (may be water, oil or other) developed at the outer bearing, and another film developed at the inner bearing. As understood, the hydrodynamic load supporting film developed is dependent upon the relative difference in speed between, for example, members 20' and 21'. Now if the intermediate sleeve is fixed in space, the relative speed difference between the contacting surfaces of the outer bearing is greater than the relative speed difference between the contacting surfaces of the inner bearing. Thus, it would appear that, as the film developed is dependent upon the relative speed difference, the load carrying capacity of the film developed at the outer bearing would be greater than the load carrying capacity of the film developed at the inner bearing. Accordingly, the embodiment of FIG. 1 tends to increase the load capacity of the inner bearing; while that of FIG. 4 also tends better to distribute the load capacity of the two bearings.

In addition, the elastic rollers, by virtue of their capability for deforming and their imperviousness to water, can operate where water, containing substantial quantities of dirt, is used as a lubricant as is the case when the shafts drive contra-rotating propellers of a ship. Further, through the use of the elastic rollers, internal clearances may be made larger to allow for shaft deflection.

Obviously many modifications and variations of the present invention are possible in the light of the above teachings. It is therefore to be understood, that within the scope of the appended claims the invention may be practiced otherwise than as specifically described.

What is claimed is:

1. In a contra-rotating, co-axial shaft assembly; an outer rotary shaft; an inner rotary shaft co-axially within said outer shaft; bearing surfaces on said inner and outer shafts; an intermediate sleeve member between said inner and outer shafts and having bearing surfaces contacting said shaft bearing surfaces; roller means driven by said inner and outer shafts; and means on said shafts and said intermediate sleeve member for confining said roller means for angular movement with said sleeve member with respect to the axis of said shafts.

2. In a contra-rotating co-axial shaft assembly, spaced inner and outer co-axial shafts rotatable in the opposite directions, a plurality of roller members between and contacting said shafts providing a planetary arrangement therewith, a tubular bearing member between said shafts, said bearing member and inner shaft having cooperating contacting slider bearing surfaces, and said bearing member and outer shaft having cooperative contacting slider bearing surfaces.

3. In a contra-rotating, co-axial shaft assembly, a tubular outer shaft, an inner shaft co-axially inside said outer shaft and spaced therefrom, bearing means contacting an inner surface of said outer shaft and an outer surface of said inner shaft, said inner and outer shafts comprising axially spaced flange means, roller means in the space between and in rolling engagement with said flange means, whereby said roller means are rotated by said flange means, and means mechanically associating said bearing means and roller means for maintaining them in relatively predetermined spatial positions with respect to each other during rotation of said shafts.

4. In a contra-rotating, co-axial shaft assembly, a tubular outer shaft, an inner shaft co-axially inside said outer shaft, and bearing means for said shafts, said bearing means also maintaining said shafts spaced, roller means comprising a plurality of circumferentially spaced roller members, each member being driven on opposite sides by rotation of said inner and outer shafts, and means interconnecting said bearing means and roller means for maintaining said roller members and bearing means in a predetermined spatial relation with respect to each other.

5. In a contra-rotating, co-axial shaft assembly, spaced inner and outer shafts rotatable in opposite directions, a tubular intermediate sleeve between said shafts, said shafts and sleeve comprising means providing sliding bearing contact between said sleeve and each of said shafts, a plurality of circumferentially spaced roller members, means positioning said roller members at a predetermined location alongside an end of said sleeve, said inner shaft having a portion rollingly contacting a side of roller members, said outer shaft having a portion rollingly contacting the opposite side of said roller members.

6. In a contra-rotating, co-axial shaft assembly as defined in claim 5 wherein said positioning means comprising axially spaced flanges on said shafts.

7. In a contra-rotating, co-axial shaft assembly as defined in claim 5, wherein said positioning means and said portions on said shafts comprise a flange on said inner shaft and a flange on said outer shaft, and comprise a sleeve portion extending axially above said inner shaft flange and beyond it in the direction of said outer flange shaft, said roller members being balls, said sleeve portion having pockets for said balls.

8. In a contra-rotating co-axial shaft assembly, spaced inner and outer shafts rotatable in opposite directions, a tubular intermediate sleeve between said shafts, said shafts and sleeve comprising means providing sliding bearing contact between said sleeve and each of said shafts, a plurality of circumferentially spaced roller members, means positioning said roller members at a predetermined location alongside an end of said sleeve, said positioning means comprising portions on said sleeve providing a pocket for each of said roller members, said inner shaft having a portion rollingly contacting a side of roller members, and said outer shaft having a portion rollingly contacting the opposite side of said roller members.

9. In a contra-rotating, co-axial shaft assembly, spaced inner and outer shafts rotatable in opposite directions, a tubular intermediate sleeve between said shafts, said shafts and sleeve comprising means providing sliding bearing contact between said sleeve and each of said shafts, a plurality of circumferentially spaced balls, means positioning said balls at a predetermined location alongside an end of said sleeve, said inner shaft having a portion rollingly contacting a side of said balls, and said outer shaft having a portion rollingly contacting the opposite side of said balls.

10. In a contra-rotating co-axial shaft assembly, spaced inner and outer shafts rotatable in opposite directions, a tubular intermediate sleeve between said shafts, said shafts and sleeve comprising means providing sliding bearing contact between said sleeve and each of said shafts, a plurality of circumferentially spaced cylinders, means positioning said cylinders at a predetermined location alongside an end of said sleeve, said inner shaft having a portion rollingly contacting a side of said cylinders, and said outer shaft having a portion rollingly contacting the opposite side of said cylinders.

11. In a contra-rotating, co-axial shaft assembly as defined in claim 10 wherein the axes of said cylinders are parallel to the axis of said sleeve.

12. In a contra-rotating co-axial shaft assembly, spaced inner and outer shafts rotatable in opposite directions, a tubular intermediate sleeve portion between said shafts, said shafts and sleeve comprising means providing sliding bearing contact between said sleeve and each of said shafts, a plurality of circumferentially spaced balls, means positioning said balls at a predetermined location alongside an end of said sleeve, said positioning means comprising portions on said sleeve providing a pocket for each of said balls, said inner shaft having a portion rollingly contacting a side of said balls, and said outer shaft having a portion rollingly contacting the opposite side of said balls.

13. In a contra-rotating, co-axial shaft assembly as defined in claim 12 wherein said portions on said shafts comprise a flange on said inner shaft and on said outer shaft an axially spaced flange.

14. In a contra-rotating co-axial shaft assembly, spaced inner and outer shafts rotatable in opposite directions, a tubular intermediate sleeve portion between said shafts, said shafts and sleeve comprising means providing sliding bearing contact between said sleeve and each of said shafts, a plurality of circumferentially spaced cylindrical rollers, means positioning said cylindrical rollers at a predetermined location alongside an end of said sleeve, said positioning means comprising portions on said sleeve providing a pocket for each of said cylindrical rollers, said inner shaft having a portion rollingly contacting a side of said cylindrical rollers, and said outer shaft having a portion rollingly contacting the opposite side of said cylindrical rollers.

References Cited in the file of this patent
UNITED STATES PATENTS

| | | |
|---|---|---|
| 1,778,391 | Kendall | Oct. 14, 1930 |
| 1,797,223 | Annis | Mar. 24, 1931 |
| 2,318,990 | Doran | May 11, 1943 |
| 2,789,021 | Pedersen | Apr. 16, 1957 |